United States Patent [19]

De Niel et al.

[11] Patent Number: 5,188,732
[45] Date of Patent: Feb. 23, 1993

[54] ION EXCHANGE RESIN HOLDER

[75] Inventors: Marc A. De Niel, Brussels; Dirk F. de Ruijter, Deurne; Leo N. Vackier, Gravenwezel; Bart J. Verlinden, Tongeren, all of Belgium

[73] Assignee: Agfa-Gevaert, N.V., Mortsel, Belgium

[21] Appl. No.: 832,308

[22] Filed: Feb. 7, 1992

[30] Foreign Application Priority Data

Mar. 6, 1991 [EP] European Pat. Off. ........ 91200482.7

[51] Int. Cl.$^5$ ............................................. B01D 24/48
[52] U.S. Cl. ..................................... 210/285; 210/289; 210/456
[58] Field of Search ............... 210/279, 282, 285, 289, 210/291, 456

[56] References Cited

U.S. PATENT DOCUMENTS

| 277,203 | 5/1883 | Benson | 210/285 |
| 1,668,207 | 5/1928 | Hughes | 210/285 |
| 3,875,053 | 4/1975 | Siegers | 210/285 |

Primary Examiner—Ivars Cintins
Attorney, Agent, or Firm—Breiner & Breiner

[57] ABSTRACT

An ion-exchange resin holder (18) to recover silver from photographic rinsing water with a perforate inlet (37) and outlet (29) resin restrainer between which a mass (38) of ion-exchange resin is restrained in the holder and a liquid restrainer (32) near the inlet for deflecting part of the incoming water towards the bottom end, and for allowing another part of said incoming water to pass undeflectedly towards the outlet opening.

14 Claims, 3 Drawing Sheets

ION EXCHANGE RESIN HOLDER

BACKGROUND OF THE INVENTION

1. Field of the Invention

The present invention relates to an ion-exchange resin holder for recovering silver from rinsing water of a photographic processing apparatus.

2. Description of the Prior Art

To recover silver from the rinsing water of a photographic processor, there exist the following available alternatives: electrolytic recovery, metallic replacement, precipitation and ion-exchange. It has been established that ion-exchange is the most inexpensive and also the most effective technique for reducing the silver content to a rate that is low enough for effluent water.

Ion exchange can be defined as a reversible exchange of ions between a solid (resin) and a liquid (water containing ionised salts). Silver in the rinsing water is in the ionized form of silver complexes, more particularly silver thiosulphate compounds. Conventionally, to recover the silver, a strong base anion exchange resin is used. In this resin, chloride is the mobile ion and it exchanges with the silver thiosulphate to release a chloride ion while capturing the silver complex.

A serious problem encountered with ion-exchange of photographic rinsing water is that gelatin clogs the resin and restricts the liquid flow.

It has been proposed to operate with flow and counterflow through the resin. Rinsing water flows through resin in a first column to the bottom, the silver becoming captured by the resin and the gelatin becoming physically deposited on the resin. From the bottom of this first column, the water is fed through the bottom of a second column where it vigourously agitates the resin and washes out the entrapped gelatin. After some time the flow through the two columns is reversed so that the second column acts as the silver exchange column while the first column is backwashed. This method is disclosed in SMPTE Journal, Vol. 86, No. 2, February 1977, pages 65 to 68. The mentioned system performs well in practice, but is expensive because of the pressurised columns and the valves that are required to reverse the liquid flow.

There has been proposed a silver recovery device for smaller scale film processing installations operating by means of a bed of ion-exchange resin, fluidised by the rinsing water. The device comprises an ion-exchange resin holder with a liquid inlet opening at the bottom, a liquid outlet opening near the top, a pump for maintaining a circulation of rinsing water through the resin holder, and control means for controlling the operation of the circulation pump so that during operation of the processor the pump is continuously operative and during at least part of the inoperative period of the processor the pump is operated intermittently. This device has been disclosed in our pending EU Application 90 202 985.9 entitled: "Silver recovery device".

We have found that the fluid-bed operation raises difficulties with respect to a satisfactory removal of air bubbles entrapped in a resin holder. Entrapped air forms a problem at the start of a fresh resin pack in the installation, but also when operating the device, particularly at the regeneration of the resin when water has to be replaced by a regeneration liquid, e.g. fixer of the processor. Air bubbles within and in particular beneath the fluidised resin bed tend to reduce the effective cross-sectional liquid area of the holder whereby the circulation pump is not capable of attaining its predetermined rate, even in the case of a fresh resin pack. As the resin becomes progressively clogged by gelatin and the like in use, the flow rate decreases further and the efficiency of the device becomes unsatisfactory.

Another problem with fluid bed-type devices is the presence of dead zones in which there is a stagnation of ion-exchange resin and/or an accumulation of gelatin which is conductive to algae growth.

SUMMARY OF THE INVENTION

Object of the Invention

It is the object of the invention to provide an ion-exchange resin holder for use in a silver recovery device to recover silver from rinsing water from a photographic processing apparatus, constructed to enable a quick and complete removal of air bubbles between its in- and outlet, and to avoid the stagnation of ion-exchange resin.

Statement of the Invention

According to the present invention, an ion-exchange resin holder for recovering silver from rinsing water of a photographic processing apparatus, which comprises a mantle with a bottom and a top wall, the bottom wall being provided with an inlet connection and the top wall with an outlet connection for rinsing water, the diameter of said connections being smaller than the diameter of the mantle and a perforate inlet and outlet resin restrainer between which a mass of ion-exchange resin is restrained in the holder, characterised in that a liquid restrainer is provided in said holder near the inlet opening for deflecting part of the incoming water towards the bottom wall as well as to the lower end of the mantle, and for allowing another part of said incoming water to pass undeflectedly towards the outlet opening, and that the surface of the inlet restrainer is smaller than the cross-sectional surface of the holder.

It has been shown that the mentioned liquid restrainer is operative to put the complete mass of ion-exchange resin into a vigorous motion whereby any stagnation of the resin at any place is completely avoided.

The inlet resin restrainer causes as a consequence of its reduced surface an increase of the liquid velocity whereby air that tends to adhere to said restrainer is rapidly dragged along by the liquid so that the inlet restrainer becomes completely wetted by the liquid.

Small amounts of air that are entrapped within the mass of resin are more difficult to remove. It has been shown that intermittent pumping whereby the resin mass is alternately fluidized and then given the opportunity to sink to the bottom of the holder is the best way to progressively upwardly remove air from the resin.

Air removed from the resin may also become entrapped at the outlet resin restrainer. However, fluidizing the resin bed causes the resin to enter in contact with the upper resin restrainer whereby air entrapped also at that place is rapidly carried off. In this respect it is advantageous that the surface of the upper resin restrainer equals the cross sectional surface of the resin mass, i.e. of the holder.

The term "holder" refers in the present specification to an element in the form of a cartridge, that may be plugged into a recovery device and remain therein until it has become used and must be replaced by a new one. As will further be dealt with, a holder can be regenerated so that in optimum conditions the ion-exchange resin may have a lifetime equal to that of the recovery device in which it is used.

The term "holder", however, also covers an element such as a tank or the like forming an integral part of a recovery device.

Finally, this term also stands for an element that must not necessarily be thrown away when useless, but that can be arranged for being opened so that used resin can be replaced by a fresh load.

The holder may have in principle any cross-sectional form, but it will be understood that a circular or nearly circular form will cause the least problems with occasional stagnation of resin in corner spaces or the like.

Preferred but optional features of the invention are as follows.

The liquid restrainer generally has the form of a conical cap with a central opening, the axis of which coincides with the longitudinal axis of the holder and the diameter of the central opening is smaller than the diameter of the inlet connection of the resin holder.

There is a spacing between the outlet resin restrainer and the top of the holder.

The operative area of the inlet resin restrainer corresponds practically with that of the cross-sectional area of the inlet connection.

The inlet resin restrainer is mounted within the inlet connection of the resin holder and is removable therefrom. This has the advantage that the inlet restrainer can easily be replaced by a fresh one in installations where impurities and the like tend to prematurely clog the inlet restrainer which inevitably functions as a filter too.

The resin restrainers are formed by a plastic gauze. Such gauze may be clamped between two larger-mesh gauzes for sufficient mechanical support. The mesh size of the outlet resin restrainer may be equal to that of the inlet one, but may also differ therefrom.

The liquid circuit of a photographic processing apparatus comprising an ion-exchange resin holder in accordance with the invention may be arranged for regenerating resin. To that end the holder may be connected via three-way valves from the rinsing into the fixing circuit of the processor, the fixer becoming loaded with silver removed from the ion-exchange resin. This silver may on its turn be removed from the fixer by an electrolytic silver recovery device which keeps the silver contents of the fixer liquid under control. The regeneration of the ion-exchange resin can occur completely automatically, as described in the application referred to hereinbefore, so that the lifetime of the resin can be extended to several years, not to say to the entire lifetime of the recovery device.

BRIEF DESCRIPTION OF THE DRAWINGS

The invention will be described hereinafter by way of example with reference to the accompanying drawings, wherein:

FIG. 1 shows diagrammatically a photographic film processor 10 and a silver recovery device 12 connected therewith to recover silver from the rinsing water so that this may be discharged in an ecologically acceptable way to the sewer. The film processor comprises a developing station 13, a fixing station 14, a rinsing station 15 and regeneration systems for adding regeneration liquid to the developer and the fixer according these processing liquids are being consumed. The level control in the different stations may occur by means of overflow. The developing and the fixing stations may further comprise heating and pump means. The fixing station may be in communication with a device for electrolytically recovering silver from the fixer liquid. This device, as well as the silver recovery device 12 may be in modular form for easy assembling and connection to an existing film processor, but these devices may also be integrated in the film processor. All these aspects belong to the art and their further detailed description is not necessary for understanding the present invention.

The rinsing station 15 has an overflow 16 leading towards the recovery device 12. Fresh rinsing water is taken from a tap water connection 17 under control of a sensor in response to the introduction of a film in the processor.

Figure 2:
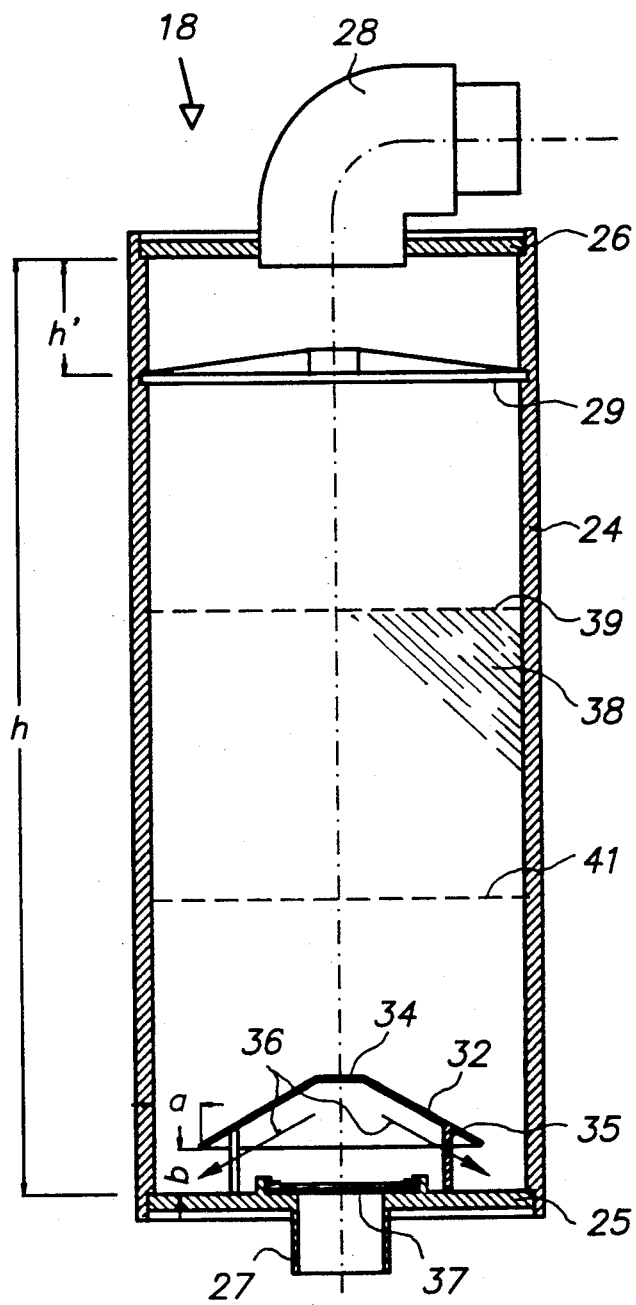
FIG. 2 is a longitudinal section view of one embodiment of the ion-exchange holder of FIG. 1.
Figure 3:
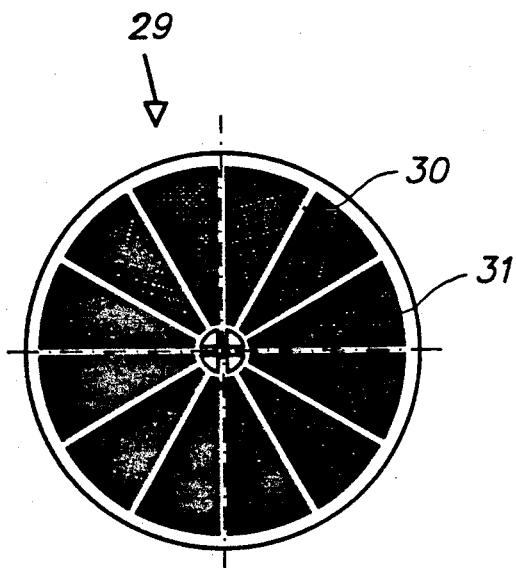
FIG. 3 is a top view of the upper resin restrainer of FIG. 2.
Figure 4:
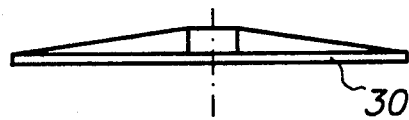
FIG. 4 is a lateral view of FIG. 3.

The recovery device comprises basically an ion-exchange resin cartridge 18, a control tank 19 and a circulation pump 20, which draws water from the tank and pumps it to the inlet of resin cartridge 18. Water leaving the cartridge flows through conduit 21 into the tank 19 and via overflow 23 from the tank to the sewer or to a next recovery device if two or more resin cartridges are provided to operate in series for a larger recovery of silver from the effluent. Tank 19 may comprise a plurality of sensors for sensing a minimum and a maximum liquid level, etc. in order to control the operation of the device properly. More details about this aspect are not relevant for the further description of the operation of the resin cartridge, but can be found in the above mentioned EU Appl. 90 202 985.9. The construction of the resin cartridge is shown in FIGS. 2 to 4.

Cartridge 18 is assembled from a cylindrical mantle 24, a circular bottom wall 25 and a top wall 26. These parts as well as the other constituent parts of the cartridge are preferably made of plastics by injection moulding or the like and may be joined by means of adhesive, ultrasonic welding or the like. The bottom wall has an inlet connection 27 in the form of a straight pipe and the top wall has an outlet connection 28 in the form of a curved pipe. Both connections are arranged for connection to a flexible hose with a hose clamp. This connecting technique requires some skill of the operator at replacement, but it will be understood that such replacement is seldom and in practice will be done by a service technician.

The resin cartridge is provided at a distance h' from its top with a resin restrainer 29 in the form of a disc snapfitting in a corresponding groove in mantle 24. The restrainer is constituted by a star-like support 30 with a closed peripheral rim (see FIG. 3) made of hard plastic whereto a gauze disc 31 is fitted, e.g. by ultrasonic welding.

The operative surface of the gauze is neglectably smaller than the cross section of the cartridge.

The entry connection of the cartridge is provided with a resin restrainer 37 in the form of a ring-shaped support whereto a gauze disc is fitted. The gauze may occasionally be clamped between two gauzes of a larger mesh size for sufficient strength to withstand the pressure of the incoming liquid current.

The cartridge is provided near the lower end with a liquid restrainer 32 in the form of a conical cap with a central opening 34. The restrainer is fitted to the bottom wall 25 by means of three angularly spaced legs such as 35. The diameter of opening 34 is approximately half the inner diameter of connection 27.

The inclination and height of cap 32 are such that a liquid current passes partly undeflected through the opening 34 in axial direction, but is also partly deflected towards the bottom wall and the lower end of the mantle, as indicated diagrammatically by the arrows 36.

The radial distance a between the rim of the restrainer cap and the mantle of the holder equals practically the distance b between said rim and bottom 25.

The cartridge is filled with ion-exchange resin in the form of pellets or beads 38 that occupy in rest position the lower part of the cartridge, up to a level indicated by a dash line 39.

The operation of the recovery device is as follows.

Suppose the installation is started with a fresh ion-exchange cartridge. Device 12 is filled with fresh tap water. This may occur by the operator pouring directly the required amount of water in tank 19, but normally a temporary addition of tap water to the rinsing tank 15 of the processor will cause a corresponding discharge of water via conduit 40 to tank 19.

Since tank 19 communicates with cartridge 18, the latter gradually fills with water, most of the air entrapped in the interstices of the resin particles being driven out through restrainer 29. As pump 20 is started, the upward liquid pressure in the cartridge raises the resin mass almost homogeneously as a piston in the mantle until withheld by restrainer 29.

The relatively high velocity of the water through inlet pipe 27 causes a rapid carrying off of occasional air bubbles that are adherant to the inlet gauze 37.

The distribution of the incoming water by cap 32 causes strong whirling in the lowest part of the cartridge whereby also at this place the resin beads are put into strong motion and forced upwardly by the liquid. A minor amount of small air bubbles remains adherent to the bottom of the resin mass that in the meantime has taken a position indicated diagrammatically by dash line 41, the top of the mass being in contact with restrainer 29. During the minutes following the start, the largest amount of air bubbles is displaced through the resin mass and passed through restrainer 29.

A small amount of air that remains occasionally trapped under the top wall 26 of the cartridge does not have any detrimental effect on the operation of the device.

Pump 20 maintains a steady circulation of liquid through tank 19 and cartridge 18.

As a film sheet is introduced in the processor 11, the input sensor causes the addition of a predetermined amount of tap water to the rinsing tank that causes overflow of a corresponding amount of liquid to tank 19 and in its turn a corresponding discharge of water through overflow 23. Water received from the processor is thus taken up in the liquid circuit of device 12. The silver carried along with it will become progressively deposited on the ion-exchange resin of cartridge 18. A next supply of rinsing water from the processor causes a corresponding discharge of already cleaned water, etc. This cleaned or partly cleaned water may go directly to the sewer, but according to a suitable embodiment this water is fed to a second and occasionally to a third recovery device connected in series so as to improve the ecological condition of the waste water, as described above.

Continued operation of the installation will cause gelatin that is carried along with the rinsing water to become deposited in such amount that the flow resistance of the cartridge may compromise the satisfactory operation of pump 20. It is therefore interesting to arrest the operation of pump 20 intermittently during rest of the film processor. This causes a slow but effective dislocation of the resin mass of the cartridge that sinks to the bottom of the cartridge and finally takes a position as the one before the start. Gelatin liberated in this way is rapidly flushed away from the cartridge when pump 20 is restarted. Additional rinsing water from the processor causes the gelatin-loaded water to become discharged through overflow 23.

It should be noted that each renewed fluidizing of the resin bed after a standstill has also an effect on the carrying off of the last rest of air that might still be entrapped in the resin mass and this makes that after a few intermittent operations of the cartridge the resin has become completely airfree.

The problem of air entrapment reappears, as the cartridge must be regenerated since this requires the emptying of device 12 and next its connection to the fixing circuit of the processor or to an appropriate separate regeneration circuit. Regeneration of a cartridge may have to occur every month, but it is clear that the inventive cartridge avoids difficulties in this respect in the same way as it did at its first liquid filling.

| | |
|---|---|
| Volume of cartridge 18: | 3 dm3 |
| Height h: | 300 mm |
| Height h': | 30 mm |
| Inner diameter of cartridge: | 115 mm |
| Diameter of cap 32: | 90 mm |
| Diameter of opening 34: | 15 mm |
| Distance a: | 12 mm |
| Distance b: | 15 mm |
| Inner diameter of inlet 27 and outlet 28: | 25 mm |
| Volume of resin mass 38: | 2 dm3 |
| Volume of cartridge between resin restrainers: | 2.7 dm3 |
| Ratio of resin vol. to vol. between restrainers: | 74% |
| Rate of pump 20: | 10 to 30 l.min$^{-1}$ |
| Max. rate of rinsing water: | 8 l.min$^{-1}$ |
| Resin used: LEWATIT, type M500MB, manufactured by BAYER AG, Germany | |
| Cartridge: made from polypropylene | |

The invention is not limited to the described embodiment. The liquid restrainer or distributor 32 may have a shape different from the illustrated one.

Figure 1:
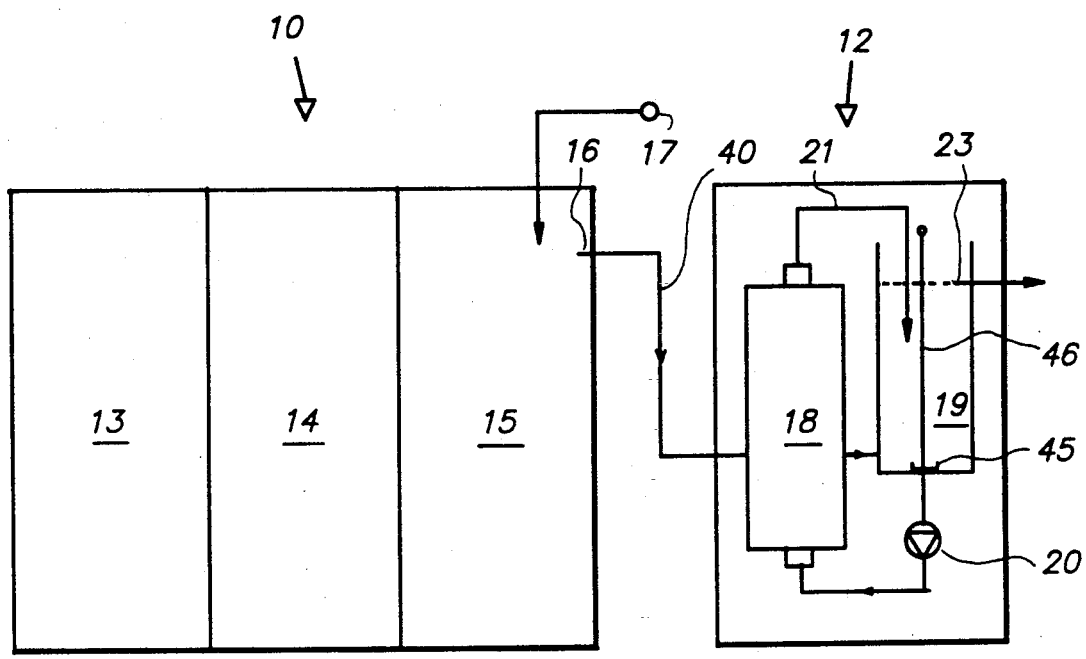
FIG. 1 is a diagrammatic illustration of a photographic film processor and a silver recovery device for removing silver from the rinsing water of the processor.
Figure 5:
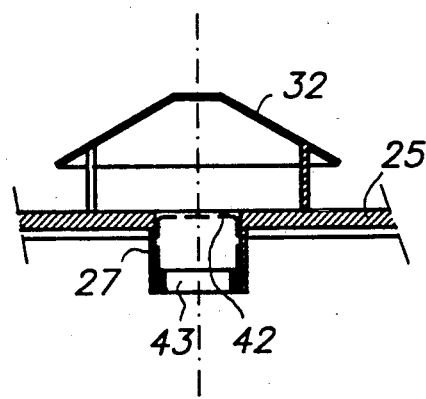
FIG. 5 illustrates a different embodiment of the inlet resin restrainer.

The inlet resin restrainer 37 may have a dome-like shape 42 and be fitted to a ring 43 that removably fits in the inlet connection 27 of the cartridge, see FIG. 5. This has the advantage that said restrainer may be periodically taken out for cleaning or replacement, which may be required to avoid flow restriction as a consequence of gelatin, impurities and the like contained in the rinsing liquid and tending to obstruct the restrainer. According to an alternative embodiment, a cup 45 with a filter gauze is placed over the outlet opening of tank 19, see FIG. 1. The filter cup is provided with a small lifting rod 46, so that it may be periodically taken out for inspection, without interrupting the operation of the device.

The fill factor of the resin may have other values than the mentioned one. Suitable fill ratios are between 50 and 90%.

Finally, recovery device 12 can be provided with a reclosable opening in its top panel for insertion of a measuring device into the tank in order to determine the silver content of the effluent water. A suitable method consists in making a test strip as commonly used for determining the fixing capacity of fixing baths, to stand for 12 to 24 hours in the solution of the tank 19. By comparison of the test zone of the test strip with the reference colour scales, a silver content down to 1 mg/l can easily be determined. The mentioned technique has been carried out successfully with Merckoquant 10008 fixing bath test strips.

We claim:

1. An ion-exchange resin holder (18) to recover silver from rinsing water of a photographic processing apparatus (10), comprising a mantle (24) with a bottom and a top wall, the bottom wall (25) being provided with an inlet connection (27) and the top wall (26) with an outlet connection (28) for the rinsing water, the diameter of said connections being smaller than the diameter of the mantle, and separate perforate inlet (37) and outlet (29) resin restrainers between which a mass (38) of ion-exchange resin is restrained in the holder, wherein a liquid restrainer (32) is provided in said holder in the proximity of inlet opening (27) which has a shape for deflecting part of the incoming water towards the bottom wall and the lower end of the mantle, and which has a central opening (34) for allowing another part of said incoming water to pass undeflectedly towards the outlet opening, and wherein the surface of the inlet resin restrainer (37) is smaller than the cross-sectional surface of the holder.

2. An ion-exchange resin holder according to claim 1, wherein the liquid restrainer (32) has generally the form of a truncated conical cap, the axis of which coincides with the longitudinal axis of the holder.

3. An ion-exchange resin holder according to claim 2, wherein the diameter of said central opening (34) is smaller than the diameter of the inlet connection (27).

4. An ion-exchange resin holder according to claim 2, wherein the conical cap (32) is fitted to the bottom wall of the holder by means of legs (35).

5. An ion-exchange resin holder according to claim 1, wherein the surface of the inlet resin restrainer (37) corresponds approximately with that of the inlet connection (27).

6. An ion-exchange resin holder according to claim 1, wherein the inlet resin restrainer (37) is provided at the outlet end of the inlet connection (27).

7. An ion-exchange resin holder according to claim 1, wherein the inlet resin restrainer (37) is removably mounted within the inlet connection (27).

8. An ion-exchange resin holder according to claim 1, wherein the operative surface of the outlet resin restrainer (29) is approximately equal to the cross-sectional surface of the holder.

9. An ion-exchange resin holder according to claim 8, wherein said operative surface of the outlet resin restrainer (29) is equal to the cross-sectional surface of the holder.

10. An ion-exchange resin holder according to claim 1, wherein there is a spacing between the outlet resin restrainer (29) and the top wall (26).

11. An ion-exchange resin holder according to claim 1, wherein the volume of the ion-exchange resin (38) is smaller than the volume determined by both resin restrainers (29, 37) in the holder.

12. An ion-exchange resin holder according to claim 11, wherein the volume of the ion-exchange resin is between 50 and 90% of the volume determined by the resin restrainers.

13. An ion-exchange resin holder according to claim 1, wherein the resin restrainers (29, 37) are formed by plastic gauze.

14. An ion-exchange resin holder according to claim 1, wherein the mantle (24) and the liquid restrainer (32) have a circular cross-section.

* * * * *